3,287,369
2',3,3',4,5',6'-HEXAHYDROSPIRO[1-BENZOTHIEPIN-4,2' - (BENZOTHIEPINO-[5,4-b]-4H-PYRAN)]-5(2H)-ONE
Richard J. Mohrbacher, Fort Washington, Pa., assignor to McNeil Laboratories, Incorporated, a corporation of Pennsylvania
No Drawing. Filed June 8, 1965, Ser. No. 462,413
1 Claim. (Cl. 260—327)

This invention relates to certain novel benzothiepin derivatives. More particularly, this invention is concerned with 2',3,3',4,5',6' - hexahydrospiro[1 - benzothiepin-4,2'-(benzothiepino - [5,4 - b]-4H-pyran)]-5(2H)-one having the formula

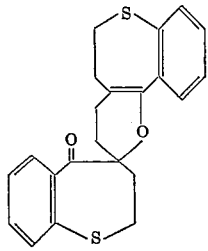

The compound of this invention has valuable pharmacological properties in view of its CNS depressant activity.

The compound of this invention is prepared by reacting 3,4-dihydro-1-benzothiepin-5(2H)-one, dimethylamine hydrochloride and paraformaldehyde in the presence of an acid such as concentrated hydrochloric acid in alcohol solution such as methanol, ethanol or isopropanol.

The following example is illustrative of, but not limited to, the novel aspects of this invention.

Example

A 60 g. (0.34 mole) quantity of 3,4-dihydro-1-benzothiepin-5(2H)-one, 40 g. (0.48 mole) of dimethylamine hydrochloride, 13.4 g. (0.149 mole) of paraformaldehyde and 0.68 ml. of concentrated hydrochloric acid in 55 ml. of 95 percent ethanol are refluxed together for 6 hours with stirring. On cooling, the two liquid layers are separated. The lower aqueous layer is diluted with water and the precipitated solid is collected by filtration and dried, M.P., 153–6° C. The solid is recrystallized twice from benzenehexane solution to give white crystals of 2',3,3',4,5',6' - hexahydrospiro[1 - benzothiepin-4,2'-(1-benzothiepino[5,4b]-4H-pyran)]-5(2H)-one, M.P., 155° C. This compound also is prepared by strong heating of 4-dimethylaminomethyl-3,4-dihydro-1-benzothiepin-5(2H)-one.

What is claimed is:
2',3,3',4,5',6' - hexahydrospiro[1 - benzothiepin-4,2'-(1-benzothiepino-[5,4-b]-4H-pyran)]-5(2H)-one.

No references cited.

WALTER A. MODANCE, *Primary Examiner.*
JAMES A. PATTEN, *Assistant Examiner.*